US008307071B2

(12) United States Patent
Donnelly et al.

(10) Patent No.: US 8,307,071 B2
(45) Date of Patent: Nov. 6, 2012

(54) FINE-GRAINED LOCATION DETERMINATION OF NETWORKED COMPUTERS

(75) Inventors: Austin Donnelly, Cambridge (GB); Bernard Aboba, Bellevue, WA (US); Roy Kuntz, Kirkland, WA (US); Gabriel Montenegro, Redmond, WA (US); Noor-E-Gagan Singh, Redmond, WA (US); Tim Moore, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 253 days.

(21) Appl. No.: 12/688,047

(22) Filed: Jan. 15, 2010

(65) Prior Publication Data

US 2011/0179158 A1    Jul. 21, 2011

(51) Int. Cl.
*G06F 15/173* (2006.01)
(52) U.S. Cl. .................. 709/224; 709/203; 709/221
(58) Field of Classification Search .................. 709/224, 709/203, 221
See application file for complete search history.

(56) References Cited

U.S. PATENT DOCUMENTS

| | | | |
|---|---|---|---|
| 7,440,442 B2 | 10/2008 | Grabelsky et al. | |
| 7,450,694 B2* | 11/2008 | Cacioppo et al. | 379/45 |
| 2002/0111172 A1* | 8/2002 | DeWolf et al. | 455/456 |
| 2003/0225893 A1 | 12/2003 | Roese et al. | |
| 2004/0160909 A1 | 8/2004 | Sheynblat | |
| 2006/0232472 A1* | 10/2006 | Roslak | 342/457 |
| 2009/0254313 A1* | 10/2009 | Armour et al. | 702/187 |
| 2009/0265318 A1 | 10/2009 | Vermeulen | |
| 2009/0291663 A1 | 11/2009 | Schultz et al. | |

FOREIGN PATENT DOCUMENTS

| | | |
|---|---|---|
| KR | 1020050006300 A | 1/2005 |
| KR | 1020090057318 A | 6/2009 |

OTHER PUBLICATIONS

Edlund, et al. Location Aggregation from Multiple Sources. Jan. 2002. Mobile Data Management 2002, proceedings. pp. 131-138.*
"International Search Report", Mailed Date: Aug. 31, 2011, Application No. PCT/US2011/020138, filed Date: Jan. 4, 2011, pp. 9.
Gray, Tim, "RedSky Ensuring Accurate Location Determination Methods for Wired and Wireless IPT Endpoints", Retrieved at <<http://www.tmcnet.com/channels/e911/articles/48326-redsky-ensuring-accurate-location-determination-methods-wired-wireless.htm>> Jan. 8, 2009, pp. 4.
"Cisco Emergency Responder Version 1.3", Retrieved at <<http://www.tdciscosolutions.ca/pdf/CiscoEmergencyResponder.pdf>> 2006, pp. 1-9.
Schulzrinne, et al., "Providing Emergency Services in Internet Telephony", Retrieved at <<http://www.cs.columbia.edu/~knarig/911.pdf>>, IEEE, vol. 6, Issue , May/Jun. 2002, pp. 15.

* cited by examiner

*Primary Examiner* — Larry Donaghue
*Assistant Examiner* — Nicholas Taylor
(74) *Attorney, Agent, or Firm* — Turk IP Law, LLC

(57) ABSTRACT

Location of a communication network subscriber is determined employing confidence metrics such as remote vs. local computer usage, primary user in a multi-user computing environment, likelihood of forgery, and comparable ones. A fine-grained location determination is then made based on the metric results and directory information for the particular subscriber such that services like emergency services can be provided with accurate location information.

15 Claims, 7 Drawing Sheets

FINE-GRAINED LOCATION DETERMINATION OF NETWORKED COMPUTERS

BACKGROUND

With the development of enhanced computing capabilities, smaller and highly capable computing devices are being used in providing communication and other services to an ever increasing number of users. Taking advantage of location determination systems such as Global Positioning Service (GPS), cellular phone tracking, and similar ones, modern communication devices are used to provide a wide variety of location-based services to users.

Emergency services are one vital aspect of modern communication systems. During the days of conventional Public Switched Telephone Network (PSTN) telephony, emergency systems such as 911, 999, 112, etc. relied on location information maintained by network administrators. This was adequate because "land-line" telephones were typically immobile. However, wireless devices and networked computers are increasingly being used for facilitating various modes of communication. With these new devices, not only is determining the location a challenge, but determining whether a device is actually being used by an assigned user is also not easily established.

Thus, providing emergency services in a modern communication network presents a challenge at least regarding the location of a user. When a user places an emergency call, the call needs to be routed to the correct dispatch in order to provide prompt service at the correct location.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to determining confidence metrics such as remote vs. local computer usage, primary user in a multi-user computing environment, and comparable ones for location of network subscribers. A fine-grained location determination may then be made based on the metrics and directory information for a particular user such that services like emergency services can be provided with accurate location information.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
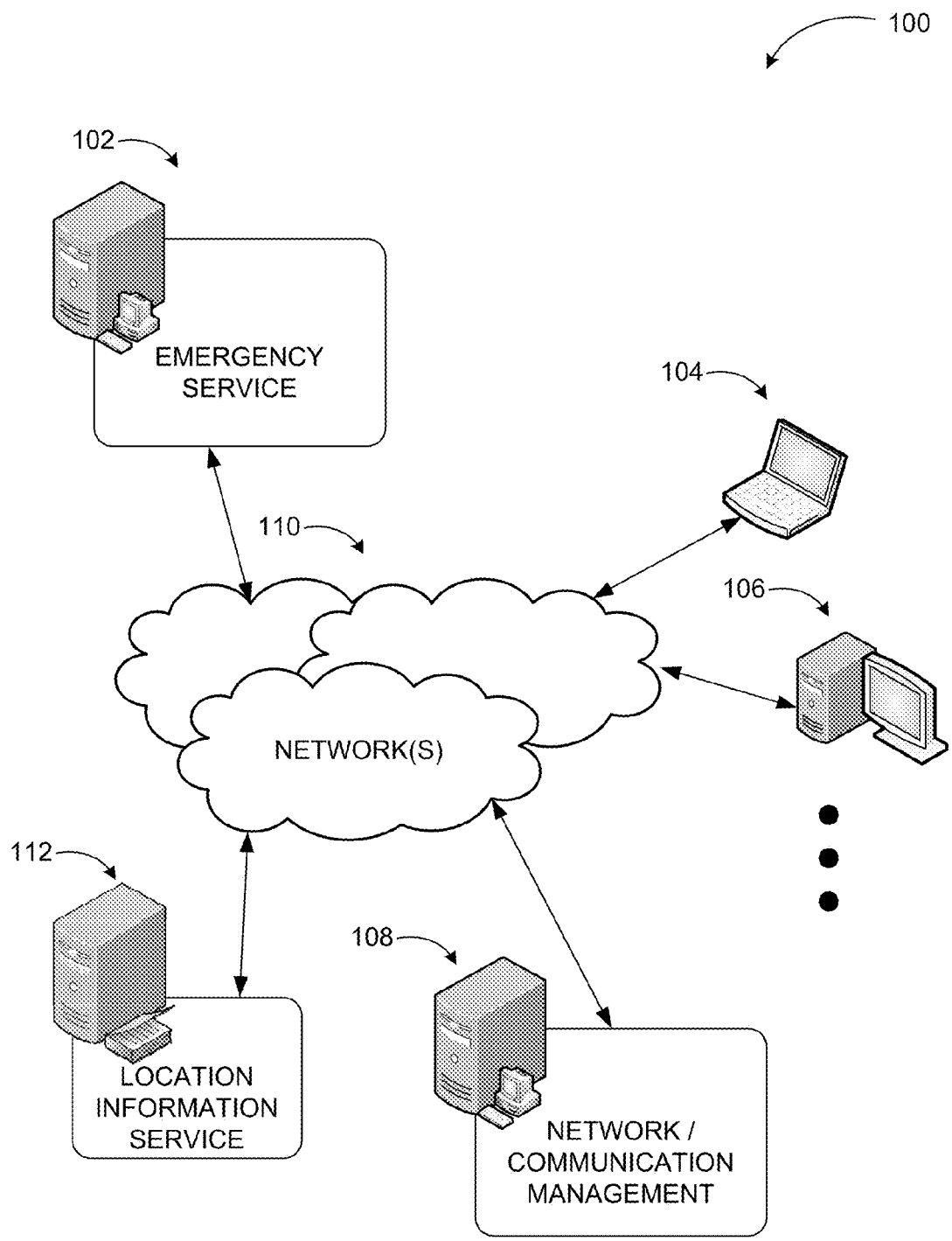
FIG. 1 is a diagram of an example multi-network communication system where emergency services may be provided employing location determination of subscribers according to embodiments.

As briefly described above, fine-grained location information for users in a networked computing environment may be determined based on confidence metrics. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing networked communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram of an example multi-network communication system where emergency services may be provided employing location determination of subscribers according to embodiments. In diagram 100, users may communicate through client devices 104 and 106 over networks 110. Network/communication management service 108 may manage various aspects of network operations including maintenance of a directory service storing information such as user locations (e.g. user offices/cubicles in an organization). Networks 110 may include one or more distinct networks and subnets. Client devices 104, 106 may include any computing device capable of executing applications to facilitate communications and other data exchanging operations.

A number of services may be provided to users over networks 110 (e.g. data storage, search, computation, analysis, and many more). Some of these services may be location-based services. Emergency service 102 is an example of a location-based service. If a user reports an emergency through a communication application over networks 110, the call (audio, video, text, or other mode) may need to be routed to an appropriate dispatch that can handle the call optimally and emergency responders need to be sent to the location of the reporting user promptly. Thus, knowledge of the accurate location of the reporting user is needed for emergency service 102.

In a system according to embodiments, location information service 112 may employ confidence metrics to determine the location of a networked communication system subscriber using a computing device for communication. One of the metrics that may be employed is local or remote use of the computing device through which communication is being facilitated. One or more users may utilize a computing device by logging in remotely or locally. If the machine is mainly being used remotely, its physical location may be irrelevant to the location of a particular subscriber, and therefore, not useful for a location-based service.

Another metric that may be employed is determination of a primary user for multi-user computing devices. If the subscriber is not a primary user of a machine, the likelihood of the subscriber being at the same location as the machine decreases. Thus, a confidence metric for the primary user of a machine may be determined based on login/logout records or similar usage information.

To prevent mistakes due to records errors or forged addresses, a confirmation may also be performed. According to an example scenario, a predefined number of computing device on the same subnet as target machine may be selected as a "witness set." A network topography investigation such as Link Layer Topology Discovery (LLTD) may be employed to check the witness set machines are actually on the same subnet. Next, the local/remote usage of the target machine may be determined. If the machine is mainly used locally but by multiple users, the primary user metric may be employed to determine the primary user of the computing device. If both (or more) metrics are satisfied, the machine's location may be matched with the subscriber's on-record location using a directory service to determine the location of the subscriber accurately. Location-based service(s) may then be provided such as routing an emergency call or sending emergency services to the location of the subscriber.

Another aspect of determining location accurately is determining likelihood of forgery. Mistakes due to issues in the wire-map are different from those that result from forgery. In case of mistakes, the goal is to discover the wire-map errors and correct them, preferably, in advance of an emergency call. In such a situation, the location information server (LIS) may utilize an algorithm to check the plausibility of a wire-map derived location, prior to providing it to the client. If the LIS decides that the location is implausible (e.g. the witness set is in a different building than that indicated by the wire-map), the LIS might take some action, such as increasing the uncertainty region, or even (in extreme conditions) declining to provide location to the client, while logging an error that can subsequently be investigated by the administrator. As a result of running the algorithm, the LIS might be able to better satisfy itself as to the accuracy and validity of the location information it is providing to the client. According to some embodiments, the LIS may actually sign location information it provides to a client, warranting the accuracy of location data subsequently passed to a Public Service Access Point (PSAP) by the client.

In case of forged location(s), an emergency call has been made, and the question is whether the location that has been enclosed in the call is plausible. Presumably, this question arises because the enclosed location is not signed or otherwise attributable to the LIS, and therefore a third party (e.g. a SIP proxy) may attempt to validate the location provided by the user, which may have been input manually or changed in some way from the location provided to the client by the LIS. Typically, a manual location is only entered in a situation where either automatic location determination is not available, or where a mistake has potentially been detected by the user. Thus, this scenario may be considerably more difficult, and a greater burden of proof may be required to override the client's location assertion. Therefore, in addition to potentially determining the uncertainty of a location determination, a system according to embodiments may also compute the likelihood of forgery using the confidence metrics described herein.

Figure 2:
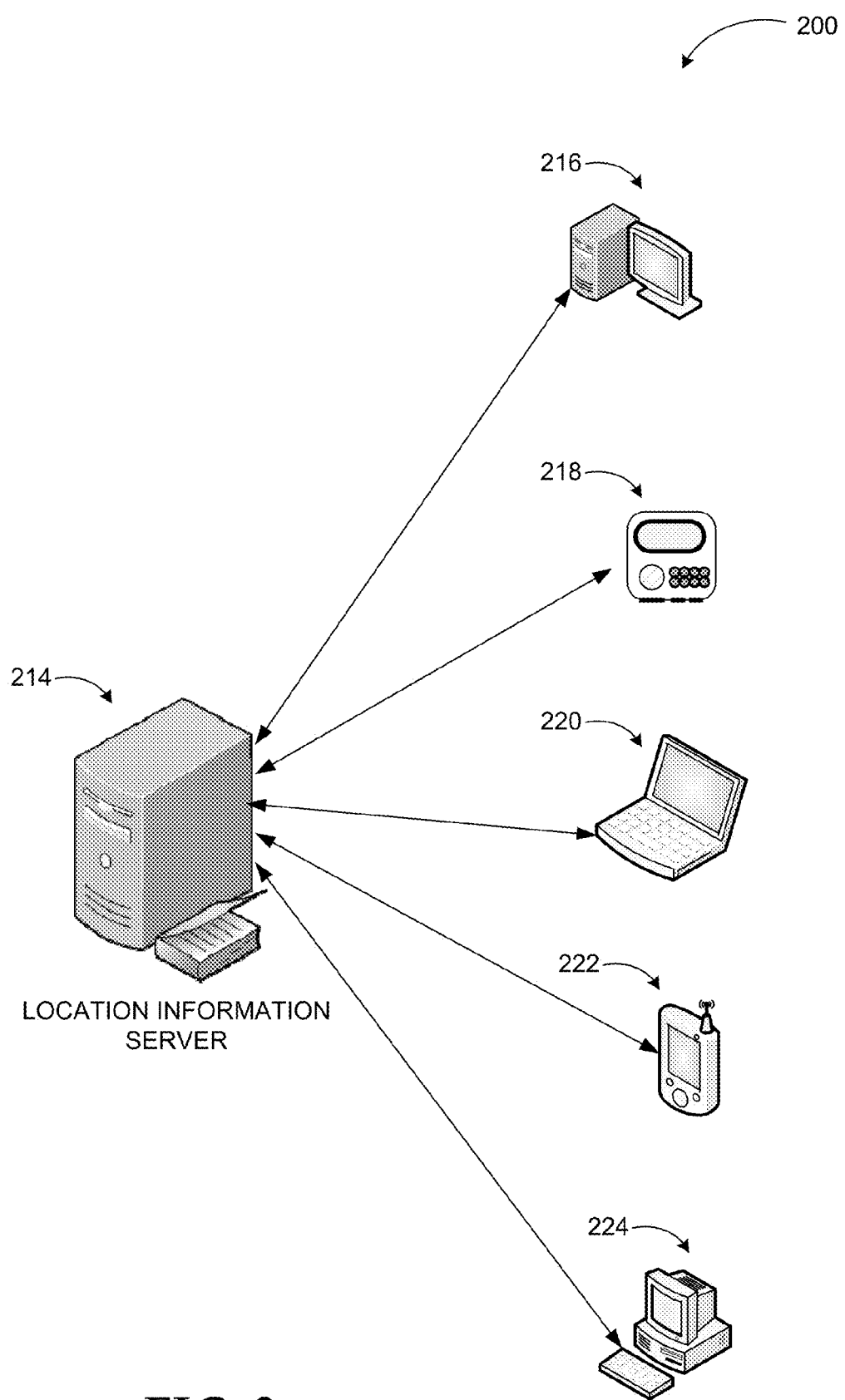
FIG. 2 illustrates a location information server interacting with client devices in order to implement a system according to embodiments.

FIG. 2 illustrates a location information server interacting with client devices in to implement a system according to embodiments. Location information server 214 of diagram 200 may use login, logout, reconnect, disconnect, boot, reboot, shutdown, workstation lock/unlock, screensaver dismissal, or similar events from client devices 216 through 224 to determine local vs. remote usage for each machine. For example, a distribution of time spent logged in versus user id for both local and remote logins may be computed. If the usage for a particular client device is determined to be local, another metric based on single or multiple user usage may be determined as discussed in more detail below.

If both metrics are satisfied, location information server 214 may look up the physical location of the target user (e.g. the user reporting an emergency) and match that location to the target client device's confidence levels. For example, the principle user's office may be determined from a database (e.g. a database query to human resources database). Appropriate location-based services may then be provided based on the determined information.

The location determination may be performed in response to an event such as a request from a location-based service, periodically, or at random intervals. According to some embodiments, a verification may be performed that the location has not changed by checking randomly selected machine (s) from witness set and confirming that they are still on the same subnet (e.g. using LLTD). Location information server 214 may also transmit associated confidence metric(s) each time it provides a location string to a location-based service.

Some location-based services such as enhanced emergency services (E911) require an audit trail so the provenance of the location information can be verified and prank calls causing emergency services to respond to a location determined by the prankster can be avoided. This plays a particular role, when the location is totally or partially determined based on user input. An audit may require tracking location provenance (e.g. how the determination was made, where the data came from), as well as user/device actions (which user/device sent the location query or made the emergency call). Since the user identities used at various stages of the process may be different (e.g. Session Initiation Protocol "SIP" Identity, device MAC address, device IP address, or authenticated identity within a location configuration protocol), establishing a complete audit trail may not be trivial.

Following is an example algorithm that may be implemented in a location information or similarly tasked server to maintain accurate and up-to-date location data. According to the example algorithm, Dynamic Host Configuration Protocol "DHCP" or similar logs may be used to select a predefined number of computing devices on the same subnet. These "witness set" machines may be contacted (e.g. pinged) to confirm that they are still online. A further check (e.g. LLTD) may be used to confirm the machines are on the same broadcast domain (subnet). These checks confirm the witness set machines are roughly at the same location.

From the security event logs or similar data stores for each machine in the witness set, relevant events for all users which have logged on to the machine may be obtained for a predefined period. The predefined period may be selected such that exceptional occasions like vacations may be captured appropriately. Relevant events may include, but are not limited to login, logout, reconnect, disconnect, boot, reboot, shutdown, workstation lock/unlock, screensaver dismissal, or similar events. Next, a local/remote usage metric may be computed (e.g. based on distribution of time spent logged in versus user id for both local and remote logins) for each machine. If the local/remote usage metric is over a predefined limit for a particular machine, the machine is mainly used by local users. Otherwise, the machine is for remote use and irrelevant for location determination.

The algorithm may then compute a primary user metric based on number of users and total time spent by each user on a particular machine. If a user is determined to be the primary user of the machine or the machine determined to be a single user machine, a directory service may be queried to obtain the physical office location information associated with the user.

Optionally, a clustering algorithm may be executed for the machines in the witness set on their chosen office locations. Outliers—machines where the directory information service may not be providing the correct answer—may be marked with a lower confidence, or an administrator alerted. According to further embodiments, up to a predefined number of the witness set may be classified as outliers. This provides robustness against isolated directory information errors. When adding a new machine to the location information service, a full clustering algorithm may not be needed. The new machine's distance may be computed from a randomly chosen member of its witness set. If the distance is sufficiently low, the machine may be considered part of the witness set with high confidence.

Location information server 214 may store data mapping machine IPs to office, witness set, machine MACs, timestamps, confidence metrics, etc. Tentative mappings may be optionally presented to an administrator for verification before being stored at (by) the location information server 214. According to other embodiments, the administrator may be provided low-confidence entries for human verification. High-confidence entries may be assumed to be correct and automatically stored at (by) the location information server 214. Client devices 216 through 224 may include computing devices such as server 216, vehicle-mount computer 218, laptop computer 220, handheld computer 222, and desktop computer 224.

Figure 3:
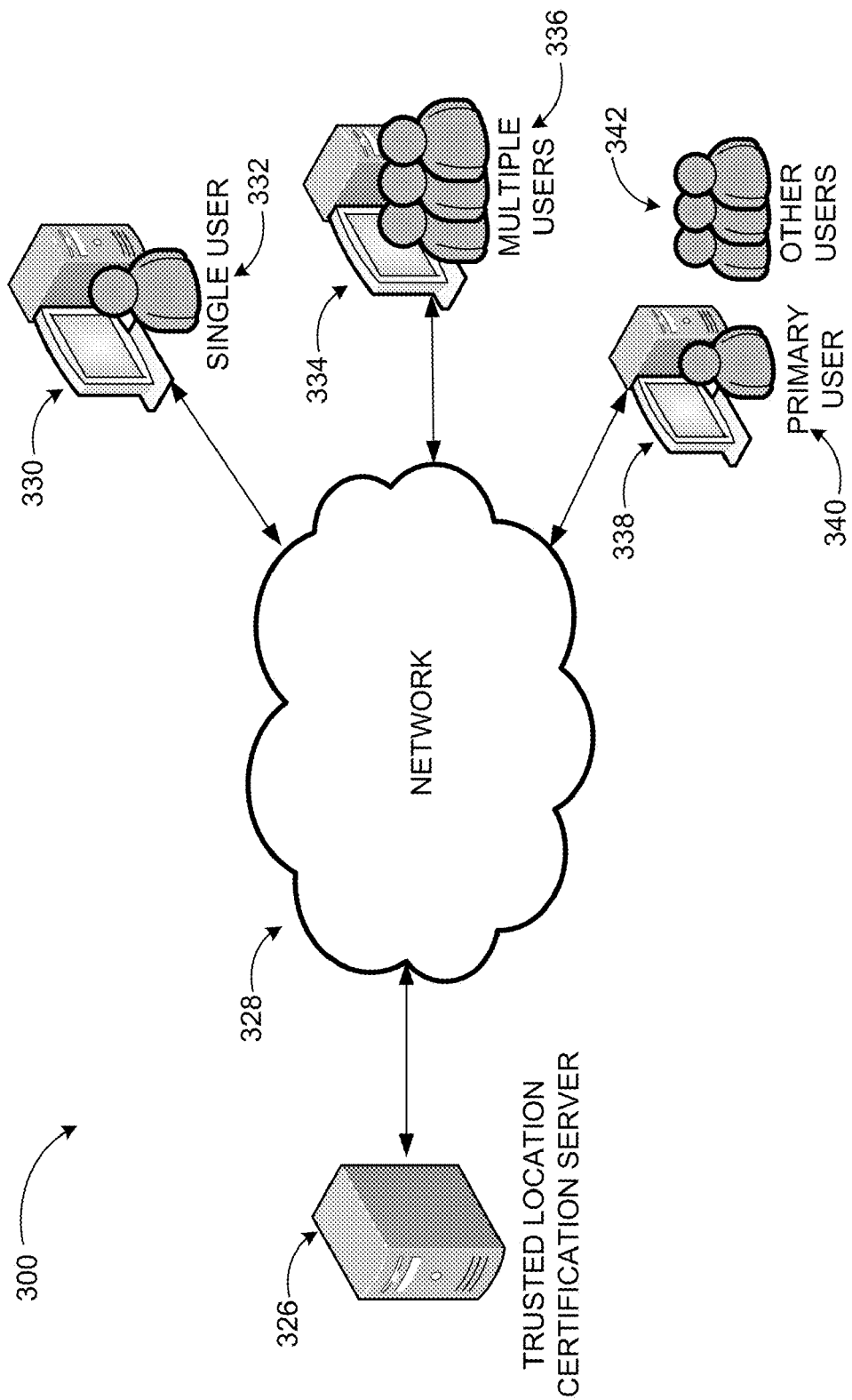
FIG. 3 illustrates location determination in a networked environment distinguishing between single and multi-user computing devices.

FIG. 3 illustrates location determination in a networked environment distinguishing between single and multi-user computing devices. As discussed above, a computing device may be a single user device, a multi-user device with a primary (or principle) user, or a multi-user device with equally distributed users. In order to be useful for location determination, the computing device needs to be one of the first two kinds. Diagram 300 illustrates a location certification server interacting with three different kinds of machines and determining the type of machine in order to compute the primary user metric.

As mentioned previously, avoidance of forged location data is important for emergency services. For this purpose, a trusted location certification server 326 may select one machine from the witness set and verify its location (e.g. by requesting an LLTD quick discover). If the calling machine's MAC address is found, then it is still on the same subnet as the witness machine. If not found, then there may be a network partition or the caller is untruthful. The trusted location certification server 326 may retry with other members of the witness set. Since the caller typically does not know the witness set (they may be randomly selected), the caller cannot lie about its location by faking its IP address. If verification succeeds, trusted location certification server 326 can cryptographically sign a location testament that vouches that the machine is actually on the same subnet as its witness set. This may be presented to the location-based service (e.g. an emergency dispatcher) as verified. Thus, the location testament may be generated based on comparing the target client device's location and identifier to the location and identifier of at least one other client device in the same witness set.

As shown in diagram 300, computing device 330 is a single user (332) machine, computing device 334 is a multi-user machine with users 336 using the machine equally, and computing device 338 is another multi-user machine with user 340 being the primary user compared to other users (342) of the same machine. Thus, when executing the example algorithm discussed above, a location information server may determine usage information over network 328 and compute the primary user metric. An example metric may be determined by the peak-to-mean ratio of the distribution for local users. If the ratio is lower than a predefined threshold, then the computing device 334 may be declared to be a multi-user machine, and the location information may need to come directly from user input or some other (external) location mechanism. If the user supplies a location string, this may need to be considered as a low-confidence location for reliability purposes. If there is only a single local user, or the ratio is above the predefined threshold, the machine may be considered single-user (330) or multi-user (338) with a primary user.

Multi-user machines may fall into two categories: kiosk-style desktops used by mobile workers or terminal servers used remotely via a network. Kiosk desktops typically have a well-defined location since they are physically secured. The location of a terminal server is less relevant, since it is the user's location that is needed, not the running application's location.

According to some embodiments, a user may be presented with opportunity to edit the location. In that case, the confidence may be marked as "user-supplied" (e.g. low) if user actually edits the location. For user-supplied locations, the entered location may be verified against those of the witness set for a reasonable proximity. If the witness set does not verify the user-supplied location, the confidence may be marked as "user-supplied—unverified" (e.g. low). If the entry is verified, the confidence may be marked as "user-supplied—witness verified" (e.g. medium). Furthermore, the directory service may be periodically checked for office changes. The checks may also be triggered by database updates or DHCP requests. Historic change records may influence the frequency of these re-checks based on the assumption that machines which have moved frequently may continue to do so (e.g. laptops).

According to yet further embodiments, a caller's IP address may be used to index the location information server to present cached location data promptly with a timestamp such that the data's staleness and confidence level can be assessed by the location-based service (e.g. a dispatcher during an emergency call or any time that higher confidence is needed for location data).

While the example systems in FIGS. 1, 2, and 3 have been described with specific components and algorithms, embodiments are not limited to the configurations and operations according to these example systems. Determining fine-grained location of computing device and users may be implemented in configurations employing fewer or additional components and performing other tasks. Furthermore, embodiments may be implemented in wired or wireless networks and in conjunction with other metrics and/or location information. For example, Received Signal Strength Indication (RSSI) data may be used in conjunction with an algorithm according to embodiments for enhanced confidence levels.

Figure 4:
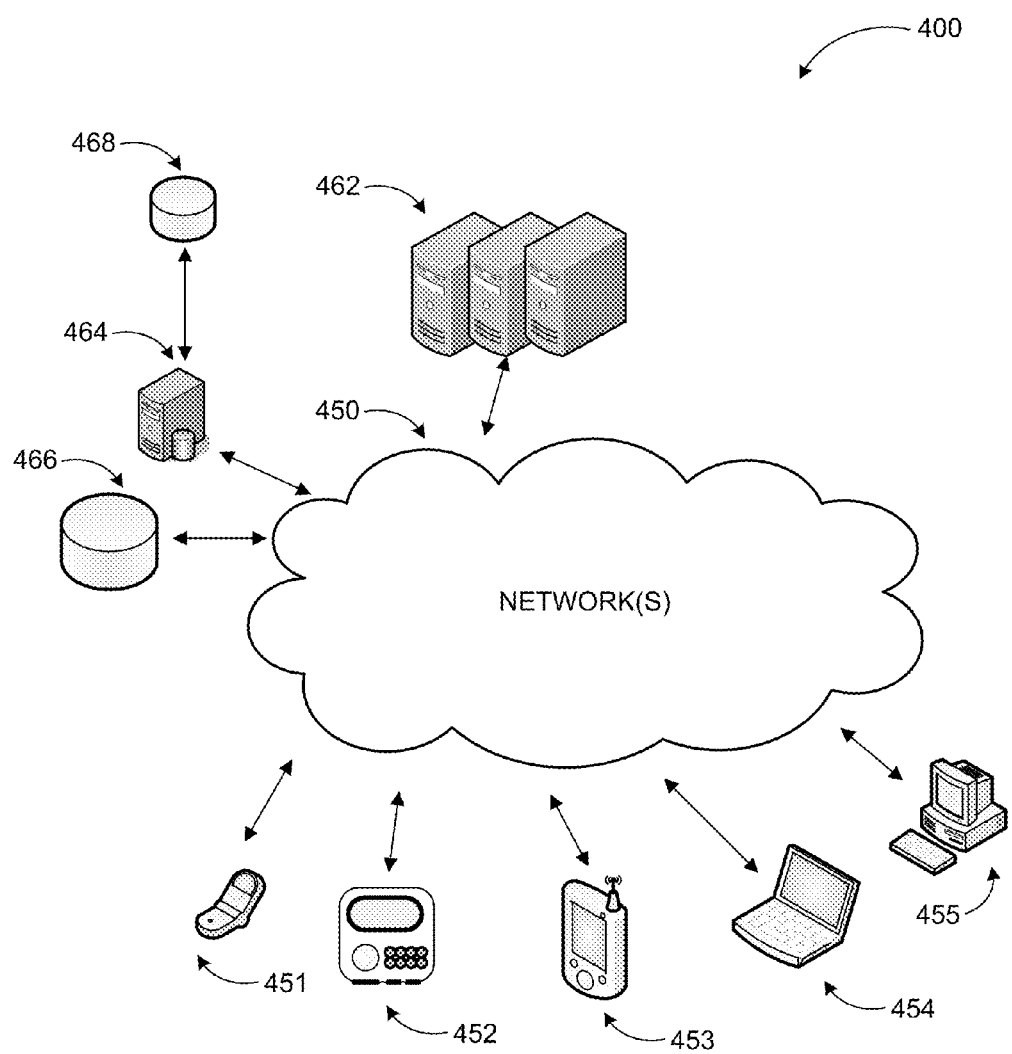
FIG. 4 is a networked environment, where a system according to embodiments may be implemented.

FIG. 4 illustrates diagram 400 of an example networked environment, where embodiments may be implemented. A platform providing location determination within networked communication systems may be implemented via software executed over one or more servers 462 such as a hosted service. The platform may communicate with client applications on individual computing devices such as a smart phone 451, a vehicle-mount computer 452, a handheld computer 453, a laptop computer 454, and desktop computer 455 ('client devices') through network(s) 450.

As discussed above, a location information service executed by one of the servers 462 may determine location of a user with confidence and provide the information to a location-based service executed by another one of the servers 462 or by yet another server at another network. The location information service may receive input from users through client devices 451-455 and retrieve directory information from data store(s) 466 or 468 (through database server 464).

Network(s) 450 may comprise any topology of servers, clients, Internet service providers, and communication media. A system according to embodiments may have a static or dynamic topology. Network(s) 450 may include secure networks such as an enterprise network, an unsecure network such as a wireless open network, or the Internet. Network(s) 450 may also coordinate communication over other networks such as Public Switched Telephone Network (PSTN) or cellular networks. Furthermore, network(s) 450 may include short range wireless networks such as Bluetooth or similar ones. Network(s) 450 provide communication between the nodes described herein. By way of example, and not limitation, network(s) 450 may include wireless media such as acoustic, RF, infrared and other wireless media.

Many other configurations of computing devices, applications, data sources, and data distribution systems may be employed to implement a communication system with fine-grained location determination capability. Furthermore, the networked environments discussed in FIG. 4 are for illustration purposes only. Embodiments are not limited to the example applications, modules, or processes.

Figure 5:
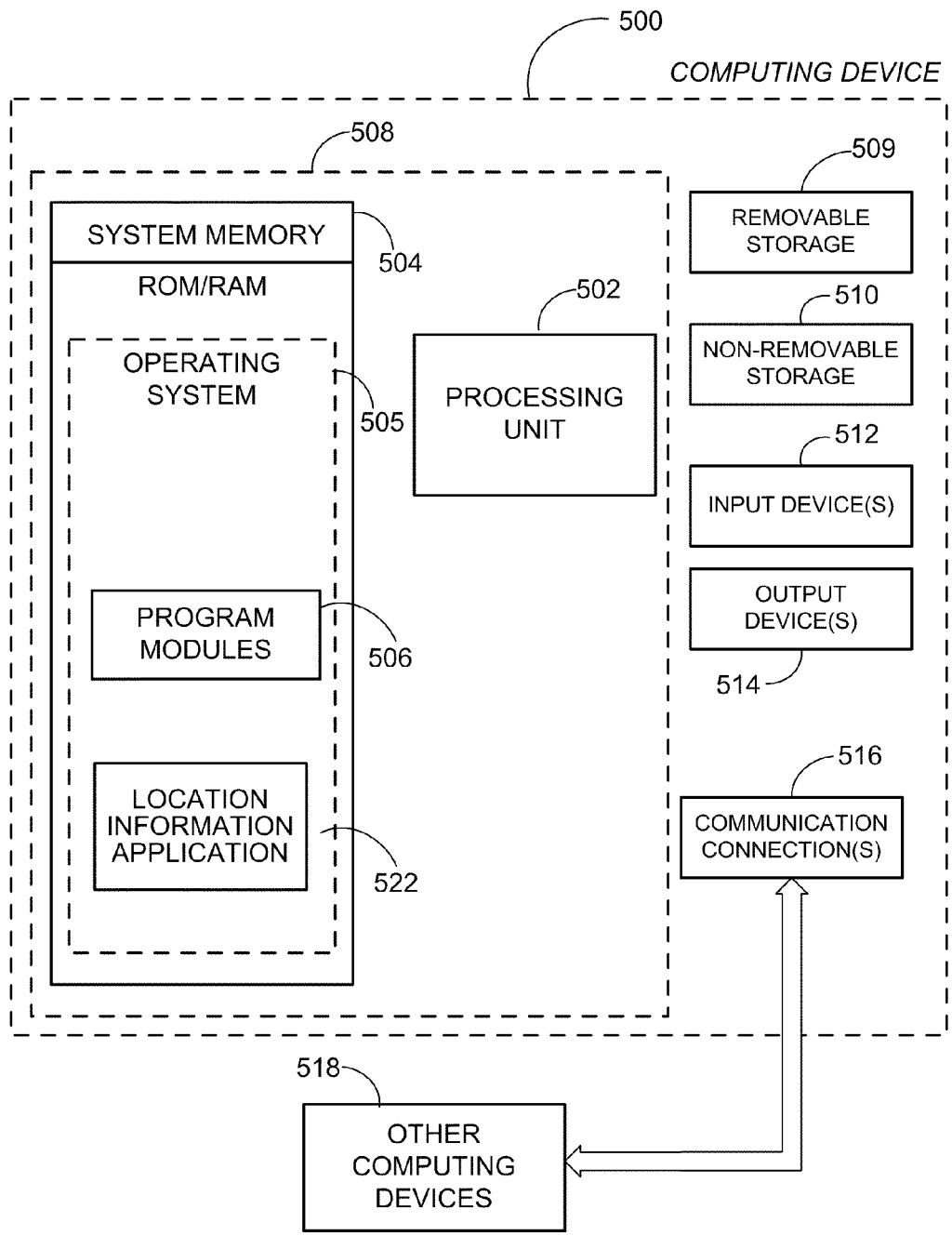
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for a location information application according to embodiments is illustrated, such as computing device 500. In a basic configuration, computing device 500 may be a server and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506 and location information application 522.

Location information application 522 may determine locations of users and associated computing devices based on confidence algorithm(s) as discussed previously. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, directory servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
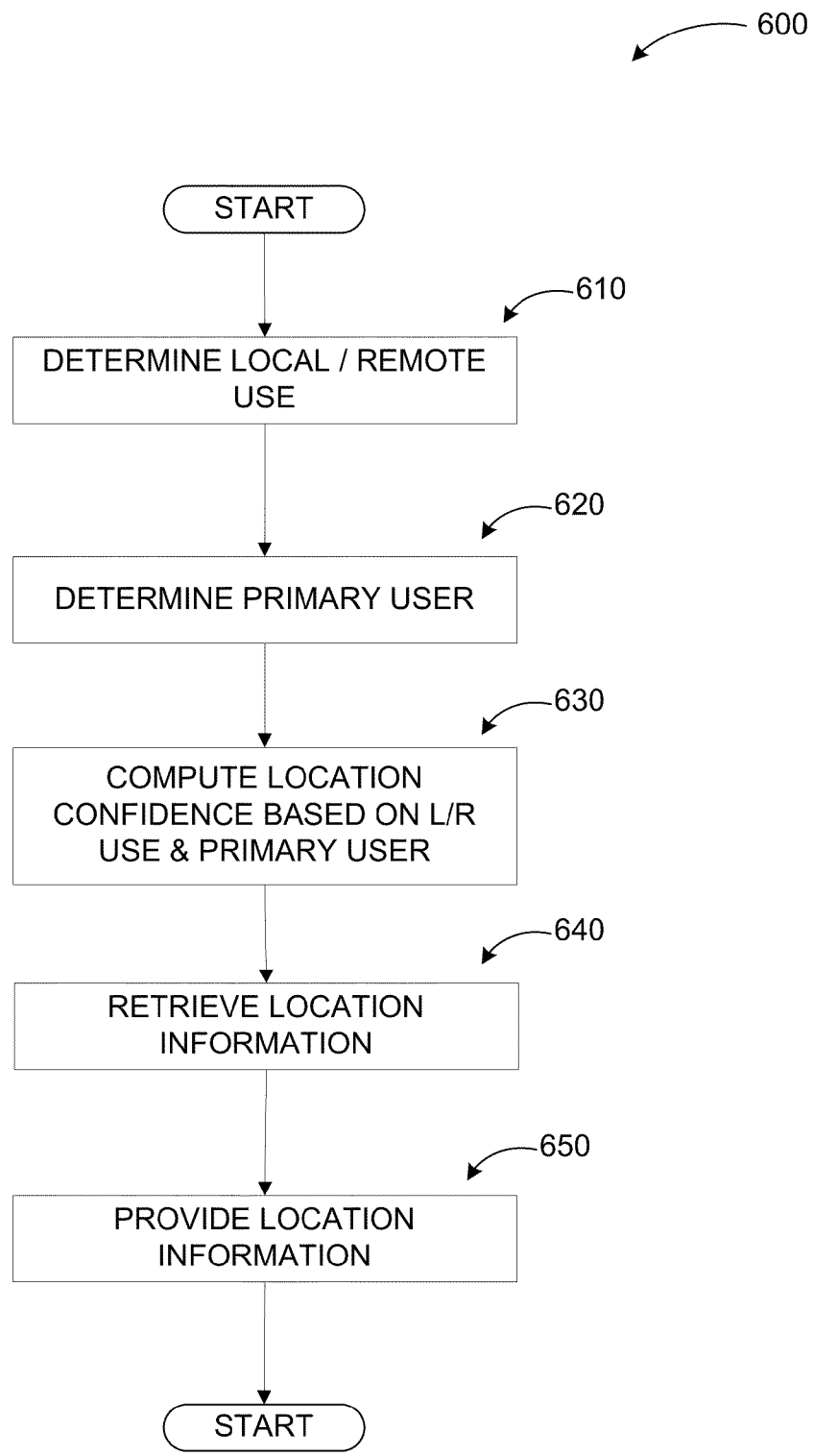
FIG. 6 illustrates a logic flow diagram for a process of determining location information in a networked computing environment according to embodiments.

FIG. 6 illustrates a logic flow diagram for process 600 of determining location information in a networked computing environment according to embodiments. Process 600 may be implemented as part of a networked communication system in a location information server.

Process 600 begins with operation 610, where a determination is made as to whether a target computing device is mainly used as a local machine or remote machine. The computing device's type (e.g. desktop computer, laptop computer, server, etc.), login/logout records, subnet location, and comparable parameters may be used to determine whether the machine is used locally or remotely. If the machine is a remotely used computing device, it is likely to be irrelevant for location determination. If the machine is mainly used locally, user status may be determined at next operation 620. If the computing device is exclusively used by a single user, it is likely to provide relevant information for location. If the machine is a multi-user device, on the other hand, usage may be examined to determine whether a user of interest (e.g. the user placing an emergency call) is the primary user of the machine. This may be accomplished through examining a number of events as discussed previously.

At operation 630, a location confidence is computed based on the local vs. remote use and primary user determination. In some cases, user input and/or administrator feedback may also be incorporated into the confidence metric. At operation 640, the target machine's physical location is retrieved from a database (e.g. a directory service) and provided to a location-based service along with the confidence metric information at operation 650.

Figure 7:
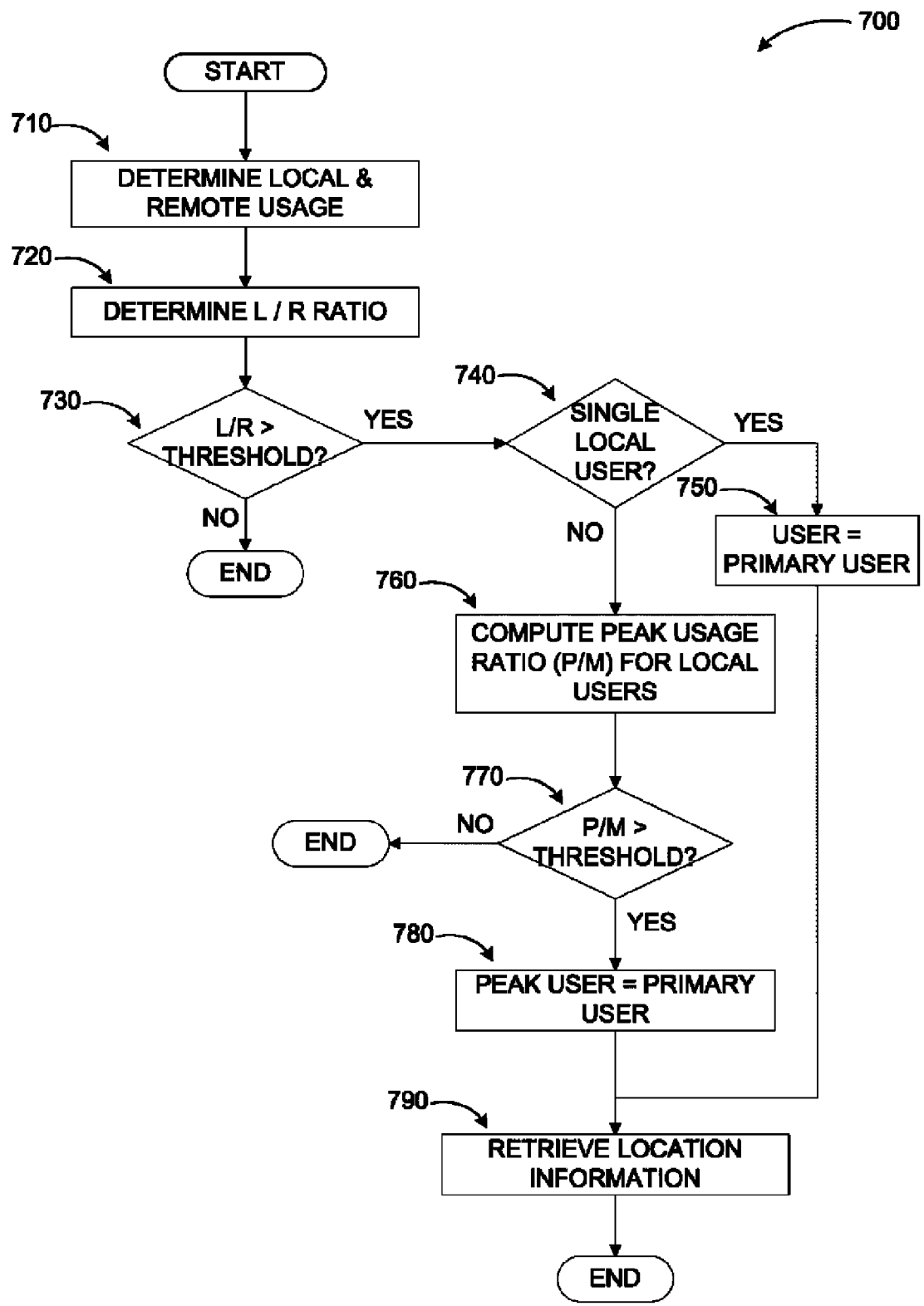
FIG. 7 illustrates a logic flow diagram for another process of determining location information in a networked computing environment with additional detailed steps.

FIG. 7 illustrates a logic flow diagram for process 700 of determining location information in a networked computing environment with additional detailed steps. Process 700 begins with operation 710, where local and remote usage patterns for a target machine are determined Based on the patterns, a local/remote usage (L/R) ratio may be computed at operation 720. For example, the L/R ratio may be total time spent logged in for local users divided by total time spent logged in by remote users.

At decision operation 730, a determination is made whether the L/R ratio exceeds a predefined threshold. The threshold may be defined by an administrator or it may be a dynamic threshold that is adjusted based on machine type, network conditions, time of day, etc. If the L/R ratio is below the threshold, the machine is irrelevant for location determination. If the L/R ratio is above the threshold, processing continues to decision operation 740, where another determination is made whether the target machine is a single user machine.

If the computing device is a single user machine, the user associated with the machine is set as the primary user at operation 750 and physical location information is retrieved for the user/machine at operation 790 as discussed previously. If the machine is a multi-user machine, a peak-to-mean usage ratio (P/M) is computed for the distribution of local users of the computing device at operation 760.

At decision operation 770, a determination is made whether the P/M ratio is higher than a predefined threshold. If the ratio is below the threshold, there is no single primary user, and the system cannot confidently determine whether the user's location is the same as the target computing device. In cases where P/M ratio is below the threshold and the machine is declared to be a multi-user machine, the location information may need to come directly from user input or some other (external) location mechanism. User supplied location information may be considered as a low-confidence location for reliability purposes.

If the ratio is above the predefined threshold, the peak user is set as the primary user at operation 780, and a confidence level may be assigned (e.g. based on the ratio) to the user-machine pair. Next, the physical location information for the user/computing device may be retrieved from a database such as a directory service at operation 790. This may be followed by delivery of the location information, confidence information, and additional data as discussed above to a location-based service.

The thresholds for determining local/remote usage and primary user may be defined and/or modified based on criteria such as number of computers in the network (subnet), usage patterns, geo-distribution, network type, and comparable conditions. The confidence level (value of confidence metric) may be on a numerical scale. For example, a value between 1 and 10 may be assigned to the confidence metric based on the L/R ratio, P/M ratio, whether user input was used, etc. A low confidence value (e.g. 1-3) may indicate to the location-based service the location may not be reliable, while a high confidence value (e.g. 7-10) may indicate high reliability. Of course, these values and the scale are exemplary and do not constitute a limitation on embodiments. Any numeric or non-numeric scale may be used to provide confidence level to the location-based service.

The operations included in processes 600 and 700 are for illustration purposes. Fine-grained location determination of networked computers may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for location determination in networked communication systems, the method comprising:

determining whether a target computing device is mainly used locally;

if the target computing device is mainly used locally, determining whether the target computing device is a multi-user device;
if the target computing device is a multi-user device, determining whether a user of interest is a primary user of the target computing device;
if the user of interest is the primary user of the target computing device, retrieving physical location information for the user of interest;
determining a confidence metric based on one or more of a local use to remote use ratio, on a peak usage ratio for local users of the target computing device, and input from the user of interest;
assigning a low confidence value to the confidence metric if the confidence metric is determined based on the input from the user of interest; and
providing the physical location information and the confidence metric to a location-based service.

2. The method of claim 1, wherein the location-based service is an emergency response service and the user of interest is a person reporting an emergency through a communication application executed on the target computing device.

3. The method of claim 1, further comprising:
assigning a high confidence value to the confidence metric if the target computing device is determined to be a single user computing device.

4. The method of claim 1, further comprising:
determining whether the target computing device is mainly used locally based on events including at least one from a set of: login, logout, reconnect, disconnect, boot, reboot, shutdown, workstation lock, workstation unlock, and screensaver dismissal.

5. The method of claim 1, further comprising:
determining the physical location information at one of: a periodic and a random interval; and
performing a verification of the physical location information in response to a request from the location-based service.

6. The method of claim 1, further comprising:
determining the confidence metric based on comparing a local-to-remote use ratio to a first threshold and comparing a peak use ratio to a second threshold, wherein the first and second thresholds are determined based on at least one from a set of: a target computing device type, a network type, a time of day, a number of computing devices in the network, a usage pattern, and a geo-distribution of the computing devices.

7. A computing device for providing fine-grained location information in a networked communication system, the computing device comprising:
a communication component for communication with a plurality of client devices;
a memory;
a processor coupled to the memory, the processor executing a location information service for performing actions including:
determine a local use ratio (L/R) for a target client device;
if the L/R is above a first threshold, determine a peak use ratio (P/M) for the target client device;
if the P/M is below a second threshold determine a primary user for the target client device from one of: a user input and an administrator input;
compute a confidence metric based on the L/R and the P/M;
retrieve physical location information for the primary user of the target client device from a directory service;
provide the physical location information and the computed confidence metric to a location-based service;
request a location testament from a trusted location certification server in response to receiving a request from the location-based service; and
receive the location testament generated based on comparing the target client device's location and identifier to the location and identifier of at least one other client device in the same witness set.

8. The computing device of claim 7, wherein the location information service is further configured to perform actions including:
select a predefined number of client devices on a same subnet as the target client device to act as a witness set; and
verify a location of the target client device by comparing the target client device's location within the network compared to a witness set at about the same location within the network.

9. The computing device of claim 8, wherein the verification is performed by examining at least one randomly selected client device of a witness set and confirming that the client devices are on the same subnet.

10. The computing device of claim 7, wherein the L/R and the P/M are determined based on examining events associated with the target client device, the events being recorded over a predefined period such that exceptional occasions are appropriately captured.

11. The computing device of claim 7, wherein the first and second thresholds are determined and dynamically adjusted based on at least one from a set of: a target client device type, a network type, a time of day, a number of client devices in the network, a usage pattern, and a geo-distribution of the client devices.

12. A computer-readable memory device with instructions stored thereon for location determination in networked communication systems, the instructions comprising:
selecting a predefined number of computing devices on a same subnet as a target computing device to form a witness set;
determining a local vs. remote use ratio for a target computing device;
determining a primary usage ratio for the target computing device;
maintaining a mapping from the target computing device to least one from a set of: a physical location, a network identifier, a machine identifier, a timestamp, and a confidence metric, wherein the confidence metric is determined based on one or more of the local vs. remote use ratio, on the primary usage ratio for the target computing device, and input from a user of interest;
assigning a low confidence value to the confidence metric if the confidence metric is determined based on the input from the user of interest;
verifying a location for the target computing device based on mapped information in response to a request from a location-based service; and
providing the verified location and the mapped information for the target computing device in response to the request to the location-based service.

13. The computer-readable memory device of claim 12, wherein the instructions further comprise:
presenting at least a portion of the mapped information to an administrator;

receiving administrator confirmation; and storing the confirmed portion of the mapped information as high-confidence entries.

14. The computer-readable memory device of claim 13, wherein the instructions further comprise:

if the target computing device is a single user device, storing the mapped information for the target computing device as a high-confidence entry;

if the target computing device is a multi-user device and the primary usage ratio is below a predefined threshold, requesting user input from the target computing device and storing the mapped information for the target computing device as a low-confidence entry; and if the target computing device is a multi-user device and user input has been received from the target computing device, verifying the received user input by examining computing devices in the associated witness set and storing the mapped information for the target computing device as a witness set verified high-confidence entry.

15. The computer-readable memory device of claim 12, wherein a frequency of determination for the local vs. remote use ratio and primary usage ratio, and a frequency of the verification are determined based on historic change records associated with the target computing device.

* * * * *